United States Patent [19]

Suzuki et al.

[11] Patent Number: 5,018,762
[45] Date of Patent: May 28, 1991

[54] AIR-BAG DEVICE

[75] Inventors: Motoharu Suzuki; Munemasa Shimamura, both of Yokohama; Hideo Omura; Makoto Hikone, both of Yokosuka, all of Japan

[73] Assignee: Nissan Motor Company, Ltd., Japan

[21] Appl. No.: 286,794

[22] Filed: Dec. 20, 1988

[30] Foreign Application Priority Data

Dec. 24, 1987 [JP] Japan .................. 62-196295[U]

[51] Int. Cl.⁵ .................. B60G 21/22; B60G 21/24; B60G 21/26
[52] U.S. Cl. .................. 280/731; 280/742; 280/743
[58] Field of Search .............. 280/728, 729, 731, 736, 280/740, 741, 742, 743; 222/3

[56] References Cited

U.S. PATENT DOCUMENTS

| | | | |
|---|---|---|---|
| 3,614,127 | 10/1971 | Glance | 280/729 |
| 3,733,091 | 5/1973 | Fleck et al. | 280/729 |
| 3,748,477 | 7/1973 | Wulbrecht | 280/743 |
| 3,752,501 | 8/1973 | Daniel et al. | 280/729 |
| 3,768,830 | 10/1973 | Hass | 280/729 |
| 3,797,855 | 3/1974 | Wright, Jr. | 280/743 |
| 3,802,719 | 4/1974 | Brown | 280/729 |
| 3,900,210 | 8/1975 | Lohr et al. | 280/743 |
| 4,013,305 | 3/1977 | Ichihara | 280/731 |
| 4,043,572 | 8/1977 | Hattori et al. | 280/729 |
| 4,167,276 | 9/1979 | Bell et al. | 280/731 |
| 4,178,017 | 12/1979 | Ishi et al. | 280/740 |
| 4,360,223 | 11/1982 | Kirchoff | 280/729 |
| 4,449,728 | 5/1984 | Pilatzki | 280/731 |

Primary Examiner—Charles A. Marmor
Assistant Examiner—Karin Tyson
Attorney, Agent, or Firm—Lowe, Price, Leblanc & Becker

[57] ABSTRACT

An air-bag device includes an air-bag proper mounted to a center pad of a steering wheel, the air-bag proper having therein upper and lower portions with respect to a condition wherein the air-bag proper is practically expanded; an inflator having gas blow openings exposed to the interior of the air-bag proper, the inflator generating gases which are to be blown into the air-bag proper through the gas blow openings; a trimmed cover covering the air-bag proper in a folded up condition; an ignitor for actuating the inflator to generate the gases; and a unique structure for restricting a flowing of the gases toward the upper part of the air-bag proper.

21 Claims, 10 Drawing Sheets

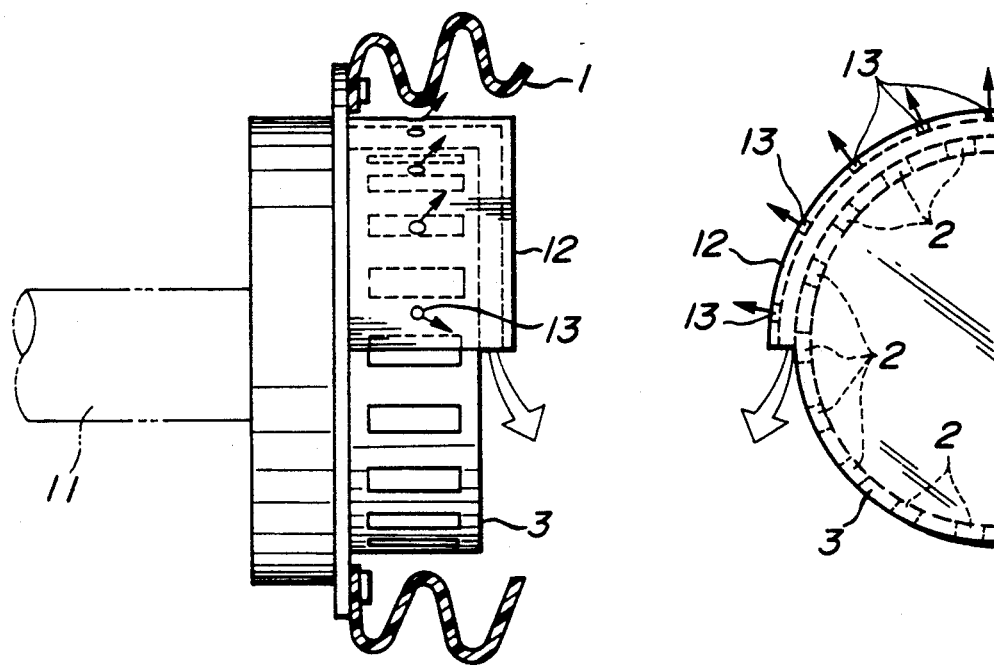

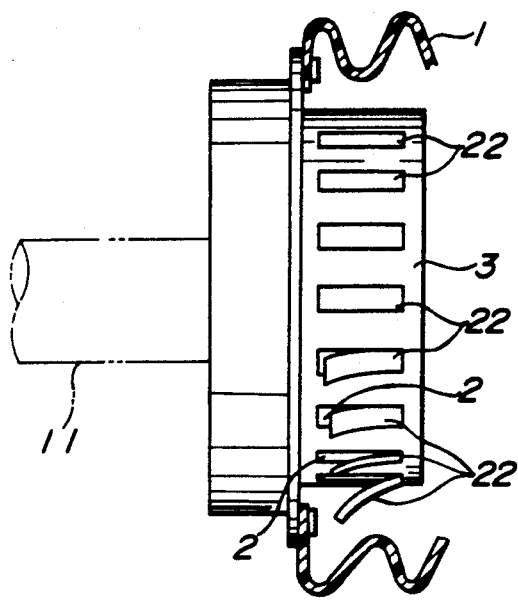
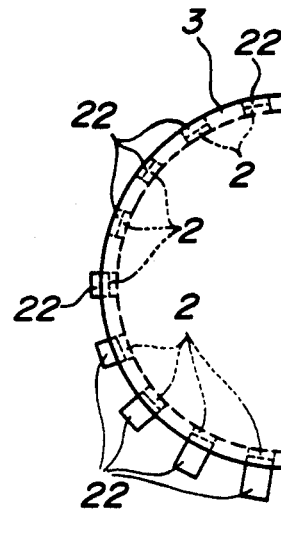
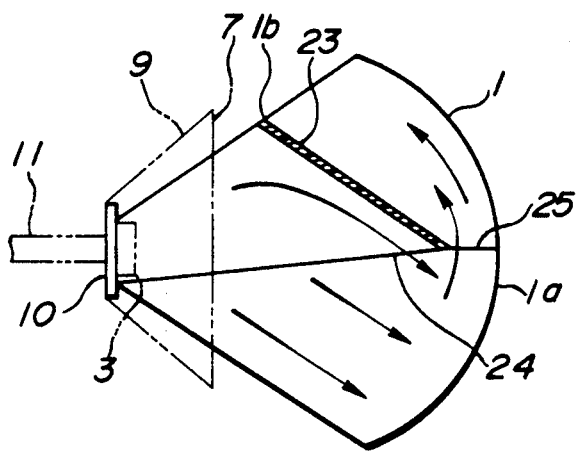
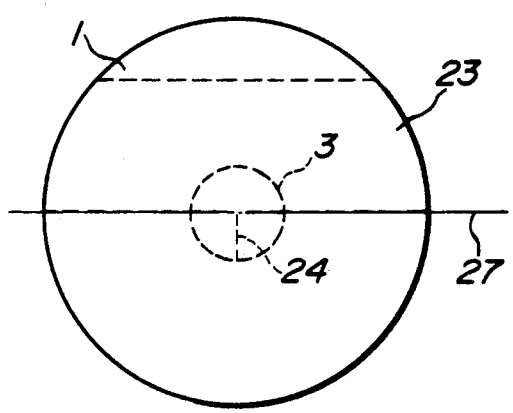
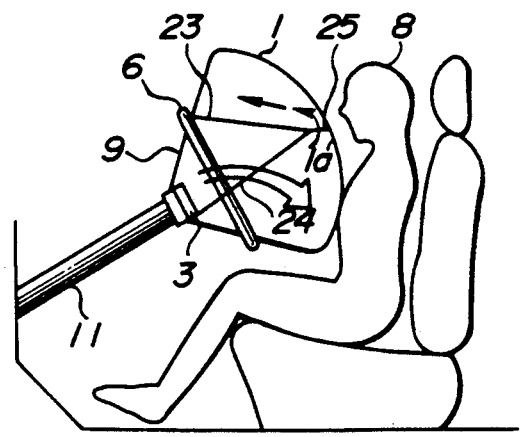

5,018,762

AIR-BAG DEVICE

BACKGROUND OF THE INVENTION

1. Field of the Invention

The present invention relates in general to safety devices of wheeled motor vehicle, and more particularly to an air-bag device which, upon a vehicle collision, expands instantly for protecting a passenger of the vehicle. More specifically, the present invention is concerned with an air-bag device which is designed to exhibit a marked passenger protection effect even when it is made compact in size.

2. Description of the Prior Art

In order to clarify the task of the present invention, one of the conventional air-bag devices hitherto proposed will be outlined with reference to FIGS. 19 and 20 of the accompanying drawings, which is disclosed in Japanese Utility Model Second Provisional Publication No. 61-11084.

As is shown in FIG. 19, the air-bag device 6 comprises an air-bag proper 1, an inflator 3 having gas flow openings 2 exposed to flow gas into the air-bag to the interior of the air-bag proper 1, an igniter 5 for actuating the inflator 3 and a trimmed cover 4 covering the air-bag proper 1 in a folded up condition. The gas flow openings 2 are equal in size and shape and arranged at equally spaced intervals.

As is seen from FIG. 20, in practical use, the air-bag device 6 is mounted to a center pad 10 of a steering wheel 7. In operation, the inflator 3 generates gas and thus inflates the air-bag proper 1. Due to the inflation of the air-bag proper 1, the trimmed cover 4 is opened or broken allowing a full inflation of the bag 1 outside of the trimmed cover 4.

However, the conventional air-bag device 6 has the following drawbacks due to its inherent construction.

Upon inflation of the air-bag proper 1, it comes to contact with the passenger 8, and the gas in the bag 1 is forced to flow upward as indicated by the thick arrow causing the upper part of the bag 1 to suffer a higher internal pressure. This causes the air-bag 1 thus expanded to shift upward from the center position of the steering wheel 7. Furthermore, in a severe case, such shifting of the expanded-bag 1 induces deformation of a spoke 9 of the steering wheel 7 as shown by a broken line in FIG. 20. Thus, a larger air-bag proper has been hitherto used for dealing with such phenomena. Of course, enlargement of the air-bag proper induces a bulky construction of the air-bag device and thus deteriorates the external appearance of the same.

SUMMARY OF THE INVENTION

It is therefore an object of the present invention to provide an improved air-bag device which is free of the above-mentioned drawbacks.

According to the present invention, there is provided an air-bag device which has a unique structure by which the undesired upward flow of gas in the air-bag proper is obstructed or at least controlled.

According to the present invention, there is provided, in a motor vehicle having a steering wheel, an air-bag device which comprises an air-bag proper mounted to a center pad of a steering wheel, the air-bag proper having therein upper and lower portions with respect to a condition wherein the air-bag proper is practically-expanded an inflator having gas flow openings exposed to the interior of the air-bag proper, the inflator generating gases which are to be blown into the air-bag proper through the gas flow openings; a trimmed cover covering the air-bag proper in a folded up condition; an ignitor for actuating the inflator to generate the gases; and a structure for restricting a flowing of the gases toward the upper part of the air-bag proper.

BRIEF DESCRIPTION OF THE DRAWINGS

Other objects and advantages of the present invention will become apparent from the following description when taken in conjunction with the accompanying drawings, in which:

FIG. 5A is a view similar to FIG. 1A, but showing a fourth embodiment of the present invention;

FIG. 5B is a view similar to FIG. 1B, but showing the fourth embodiment of the present invention;

FIG. 10A is a view similar to FIG. 1A, but showing a sixth embodiment of the present invention;

FIG. 10B is a view similar to FIG. 1B, but showing the sixth embodiment;

FIG. 11A is a schematically illustrated sectional view of an air-bag device of a seventh embodiment of the present invention;

FIG. 11B is a plan view of the air-bag device of the seventh embodiment;

FIG. 12 is an illustration of a driver's room showing advantageous phenomenon provided by the seventh embodiment;

DETAILED DESCRIPTION OF THE INVENTION

Figure 1A:
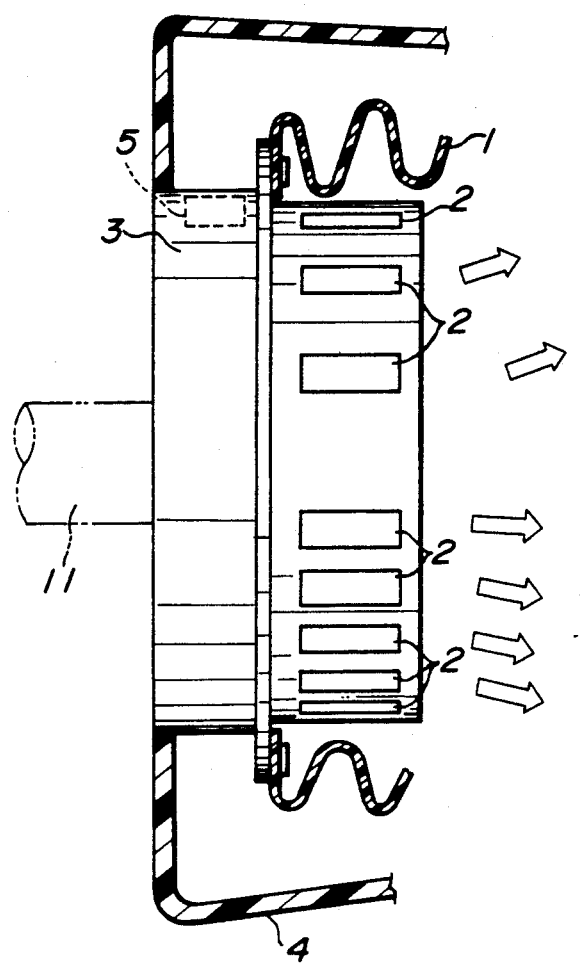
FIG. 1A is a partially cut side view of an air-bag device of a first embodiment of the present invention.
Figure 1B:
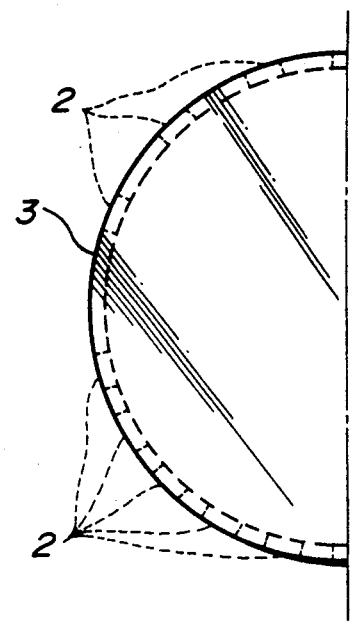
FIG. 1B is a left half plan view of an inflator used in the first embodiment.

Referring to FIGS. 1A and 1B, there is shown an air-bag device of a first embodiment of the present invention.

As is seen from FIG. 1A, the air-bag device comprises an air-bag proper 1, an inflator 3 having identical gas flow openings 2 exposed to the interior of the air-bag proper 1, an ignitor 5 for actuating the inflator 3 and a trimmed cover 4 covering the air-bag proper 1 in a folded up condition. The air-bag device is mounted to a non-rotatable center pad of a steering wheel 7 which is supported on a steering column 11.

The non-rotatable center pad is kept unmoved even when the steering wheel is rotated. One of such center pads is disclosed in U.S. Pat. No. 4,607,539 granted to Sumitsugu ARIMA et al.

As is understood from the drawings, in the first embodiment, the number of the gas flow openings 2 at an upper half of the inflator 3 is less than that of the lower half of the same. That is, the density of the openings 2 at the upper half of the inflator 3 is less than that at the lower half. It is to be noted that the terms "upper" and "lower" are taken as upper and lower with respect a condition wherein the air-bag proper 1 is expanded in a motor vehicle.

Figure 2:
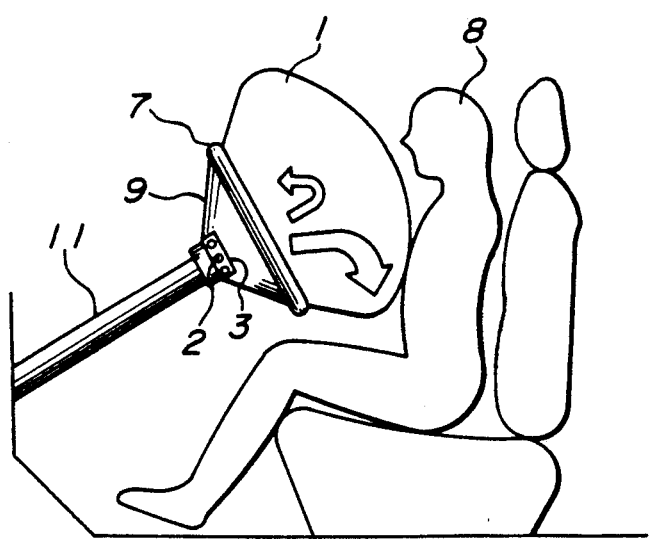
FIG. 2 is a schematic illustration of a driver's position vis-a-vis a deployed air-bag, showing an advantageous distribution in the air-bag provided by the present invention.

Operation of the air-bag device of this first embodiment will be described with reference to FIG. 2.

Upon vehicle collision, the inflator 3 generates gases and thus inflates the air-bag proper 1 after breaking the trimmed cover 4. Due to the difference in density of the gas blow openings 2, the lower part of the bag proper 1 receives a larger amount of gases, while, the upper part of the bag proper 1 receives a smaller amount of gases, as is understood from the arrows shown in the drawing. Accordingly, when the air-bag proper 1 is inflated to such a degree as to contact the passenger 8, the pressure applied to the upper part of the steering wheel 7 by the bag proper 1 is small as compared with that of the afore-mentioned conventional air-bag device. Thus, the undesired upward inclination of the steering wheel 7 does not occur.

Figure 3A:
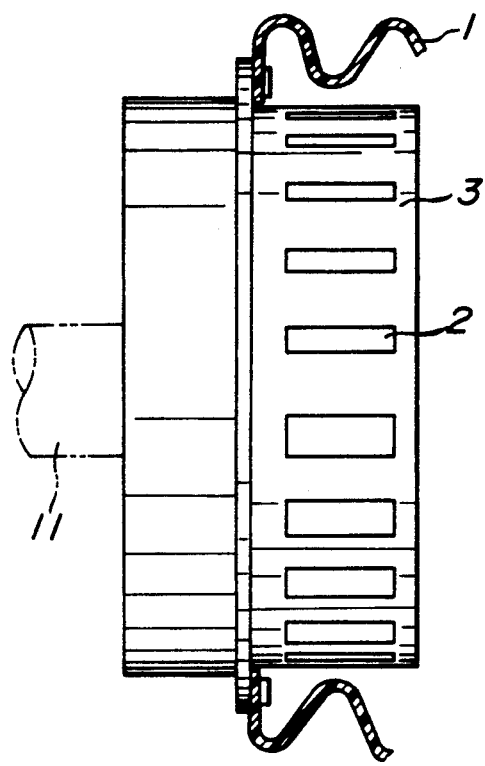
FIG. 3A is a view similar to FIG. 1A, but showing a second embodiment of the present invention.
Figure 3B:
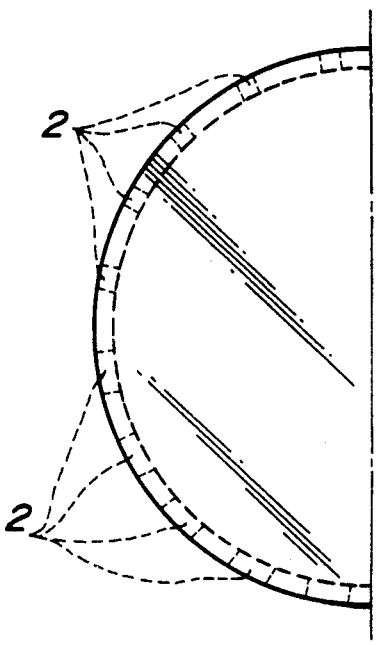
FIG. 3B is a view similar to FIG. 1B, but showing the second embodiment.

Referring to FIGS. 3A and 3B, there is shown a second embodiment of the present invention. As is seen from FIG. 3B, in this embodiment, each of the gas blow openings 2 at the upper half of the inflator 3 is smaller in size than that of the lower half. Similar effect to the first embodiment is thus expected from this second embodiment.

Figure 4A:
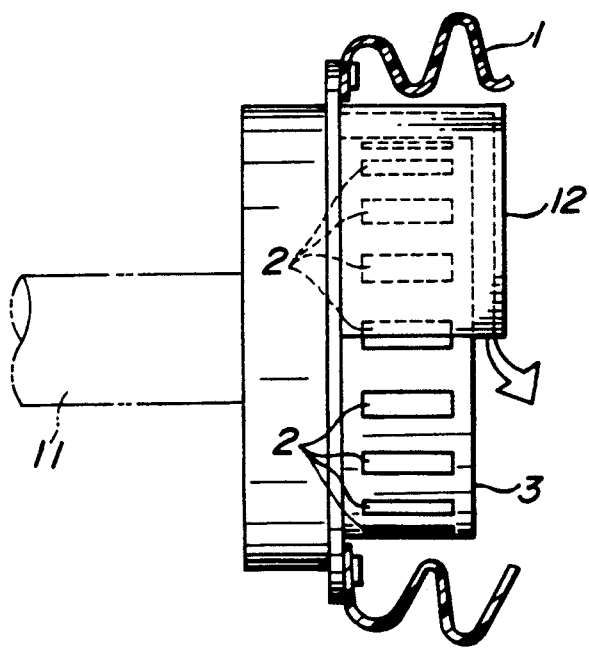
FIG. 4A is a view similar to FIG. 1A, but showing a third embodiment of the present invention.
Figure 4B:
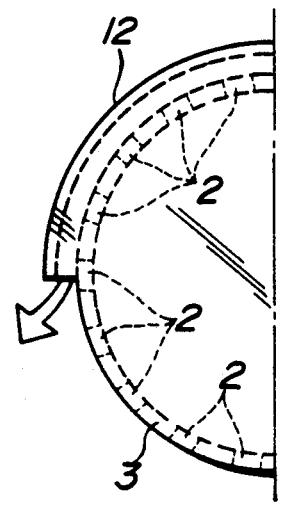
FIG. 4B is a view similar to FIG. 1B, but showing the third embodiment.
Figure 6:
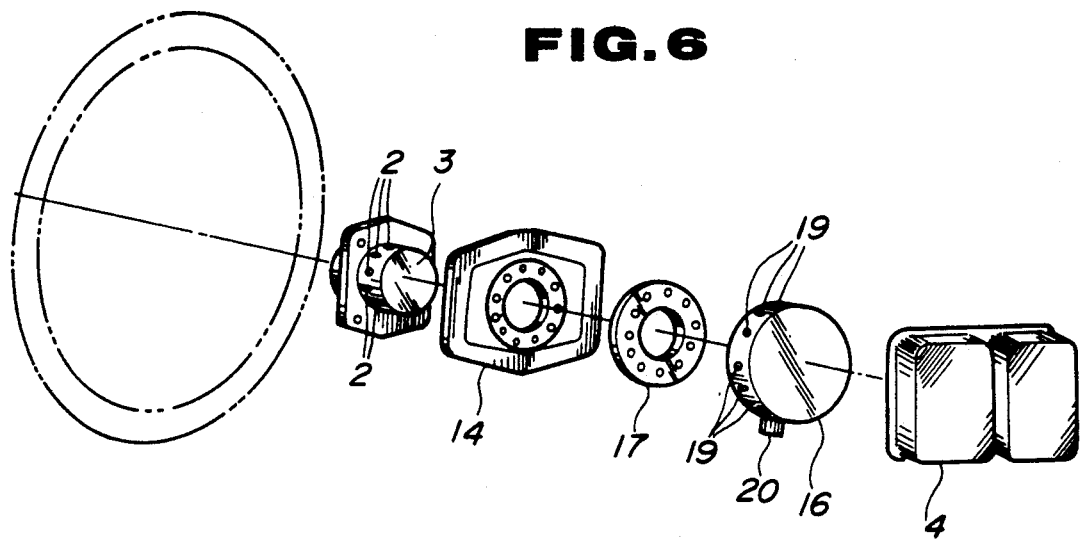
FIG. 6 is an exploded view of an air-bag device of a fifth embodiment of the present invention.
Figure 7:
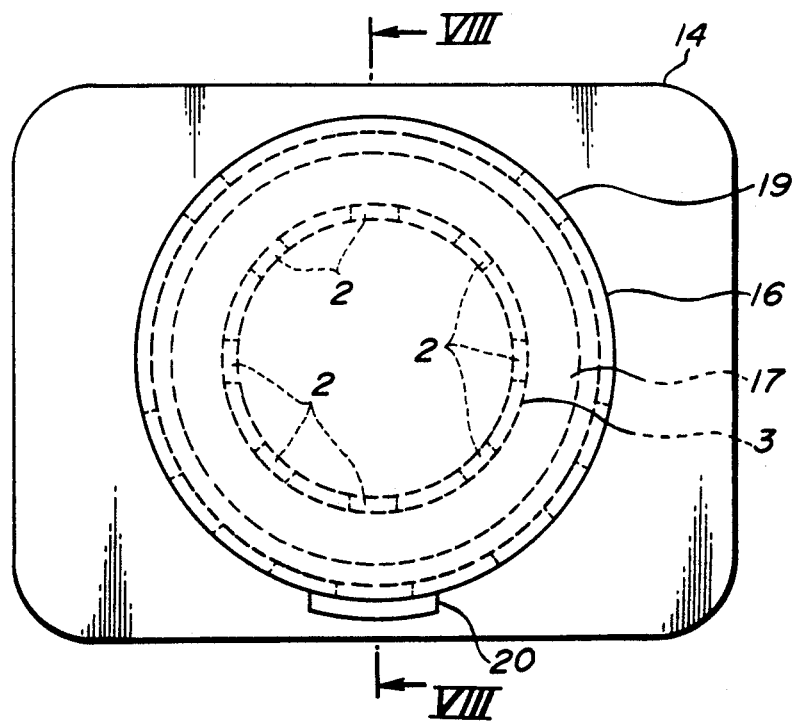
FIG. 7 is a plan view of the air-bag device of the fifth embodiment in an assembled condition.

Referring to FIGS. 4A and 4B, there is shown a third embodiment of the present invention. In this embodiment, a plurality of equally sized gas blow openings 2 are provided, which are arranged at equally spaced intervals. A cover 12 is fixed to the upper half of the inflator 3 to spacedly cover the openings 2 formed in the upper half.

In operation, the gases passing through the openings 2 of the upper half are thus forced to run in the cover 12 and blow off downwardly from opened side ends of the cover 12. For the same reason as mentioned hereinabove, the advantageous effect is expected from this embodiment.

Referring to FIGS. 5A and 5B, there is shown a fourth embodiment of the present invention. This embodiment is a slight modification of the above-mentioned third embodiment. That is, in the fourth embodiment, a plurality of small openings 13 are formed in the cover 12 permitting a slight gas blow into the upper part of the bag proper 1 therethrough.

Referring to FIGS. 6, 7, 8 and 9, there is shown a fifth embodiment of the present invention. The air-bag device of this embodiment is designed to be mounted to a rotatable center pad of a steering wheel 7. The rotatable center pad is constructed to rotate together with the steering wheel 7.

Figure 8:
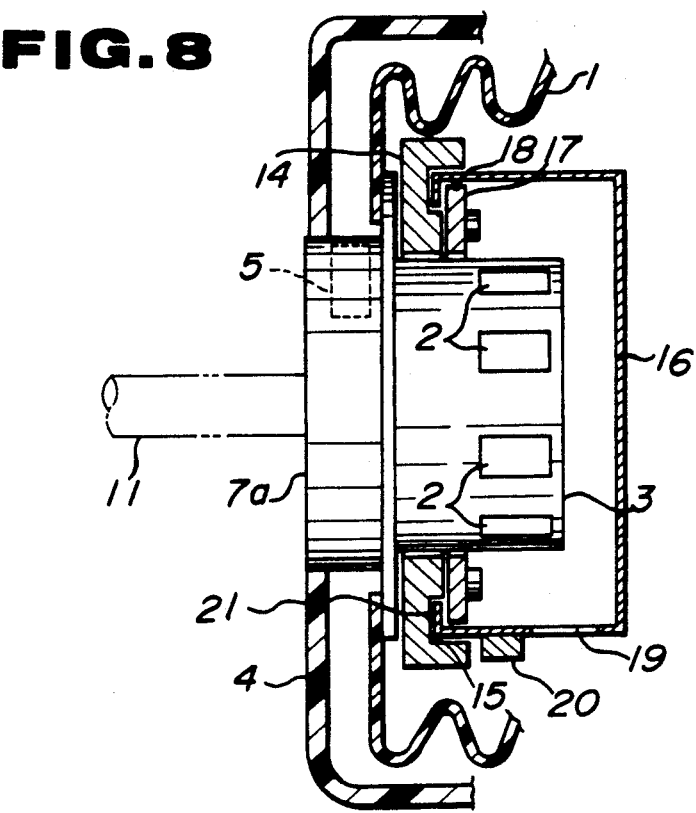
FIG. 8 is a sectional view taken along the line VIII—VIII of FIG. 7.

As is best seen from FIG. 8, the air-bag device of this fifth embodiment comprises, similar to the above-mentioned embodiments, an air-bag proper 1, an inflator 3 mounted to the rotatable center pad 7a of the steering wheel having identical gas blow openings 2 exposed to the interior of the air-bag proper 1, an ignitor 5 for actuating the inflator 3 and a trimmed cover 4 covering the air-bag proper 1 in a folded up condition.

In the fifth embodiment, the following parts are further employed, which are a mounting plate 14 secured to the inflator 3, a cup-shaped cover 16 rotatably held by the mounting plate 14 and spacedly covers the gas blow openings 2 of the inflator 3, and an annular retainer ring 17 securedly mounted on the inflator 3 to rotatably hold the cover 16. For assuring the rotatable connection between the mounting plate 14 and the cover 16, the mounting plate 14 is formed with an annular groove 15 into which an annular bent edge 21 of the cover 16 is slidably received. Designated by numeral 18 are ball bearings which are operatively disposed between the retainer ring 17 and the cover 16 for smoothing rotation of the cover 16 relative to the mounting plate 14. The cup-shaped cover 16 has a weight 20 fixed to a lower portion thereof. Thus, it will be appreciated that the cup-shaped cover 16 is kept stationary with the weight-mounted portion directed downward even when the inflator 3 rotates together with the steering wheel 7.

Figure 9:
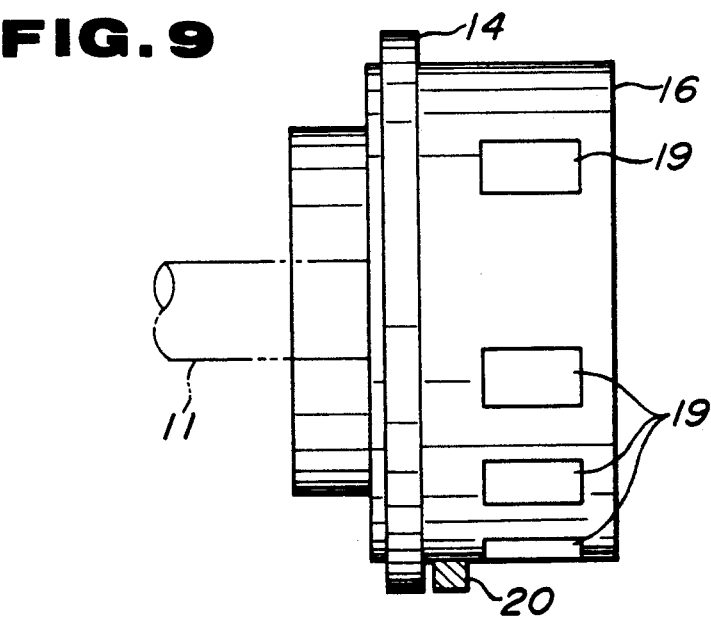
FIG. 9 is a side view of the device of the fifth embodiment.

As is seen from FIG. 9, the cup-shaped cover 16 is formed at its cylindrical wall with identical openings 19. It is to be noted that the number of the openings 19 at an upper half of the cover 16 is less than that of the lower half of the same.

Because the cup-shaped cover 16 keeps its original fixed position even when the steering wheel 7 rotates, the positional relationship among the openings 19 is kept unchanged during movement of the steering wheel. Thus, upon vehicle collision, the lower part of the bag proper 1 can receive a larger amount of gases, while, the upper part of the same receives a smaller amount of gases. Thus, the afore-mentioned advantageous effect is also expected from this embodiment.

Referring to FIGS. 10A and 10B, there is shown a sixth embodiment of the present invention. Similar to the above-mentioned fifth embodiment, the air-bag device of this embodiment is designed for a rotatable center pad of a steering wheel.

As is seen from the drawings, in this sixth embodiment, lids 22 for the gas blow openings 2 of the inflator 3 are employed. That is, each lid 22 is pivotally connected to the inflator 3 in a manner to pivot by its own weight to close the corresponding gas blow opening 2 when the same comes its upper position, and pivot by its own weight to open the opening 2 when the same comes to its lower position.

Thus, in a normal condition, the gas blow openings 2 assuming the lower positions are opened while those assuming the upper positions are closed. Thus, upon vehicle collision, the lower art of the bag proper 1 can receive a larger amount of gases and the upper part of the same receives only a smaller amount of gases. In fact, the gas flow through the upper-positioned openings 2 is obstructed by the lids 22 which are associated with the openings 2.

Referring to FIGS. 11A and 11B, there is shown a seventh embodiment of the present invention. The air-bag device of this embodiment is designed for a non-rotatable center pad 10 (see FIG. 11A) of a steering wheel 7.

As is seen from FIG. 11A, the air-bag device of this embodiment comprises an inflator 3 mounted on the non-rotatable center pad 10, an air-bag proper 1 fixed to the center pad 10 in a manner to receive therein the inflator 3, and a partition flexible sheet 23 installed in the air-bag proper 1. The partition sheet 23 has upper and side edges fixed to an inner wall of an upper portion of the air-bag proper 1 and a lower edge held by two threads 24 and 25 which extend in the air-bag proper 1 in opposite directions. That is, the thread 24 has one end fixed to the front portion of the bag proper 1 and the other end fixed to the partition sheet 2, while, the thread 25 has one end fixed to the partition sheet 23 and the other end fixed to a rear portion of the bag proper 1. Thus, upon inflation of the air-bag proper 1, there is produced upper and lower chambers which are bounded by the partition sheet 23, as is understood from the drawings. As is seen from FIG. 12, the rear end of the thread 25 is fixed to the most swelled part 1a of the air-bag proper 1. Although not shown in the drawings, a trimmed cover is mounted to the center pad 10 to cover the air-bag proper 1 in a folded up condition.

Operation of the air-bag device of this embodiment will be described with reference to FIG. 12.

Upon vehicle collision, the inflator 3 generates gases and thus inflates the air-bag proper 1 after breaking the trimmed cover. During this, the gases generated by the inflator 3 are forced to flow downward in the lower chamber along the partition sheet 23 and then flow upward into the upper chamber through a clearance defined between the lower edge of the partition sheet 23 and the air-bag proper 1, as is indicated by the arrows in FIG. 11A.

Because of the same reason as described hereinabove, the advantageous effect is also expected from this embodiment.

Figure 13A:
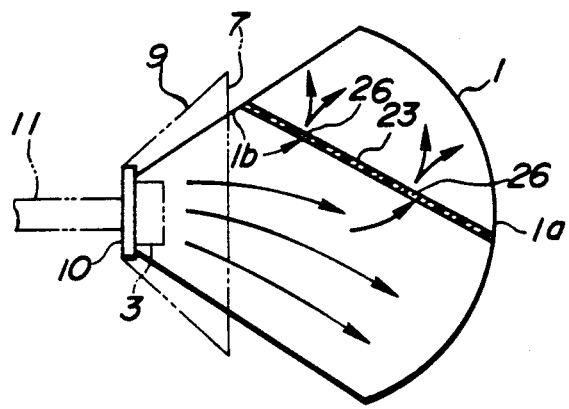
FIG. 13A is a view similar to FIG. 11A, but showing an eighth embodiment of the present invention.
Figure 13B:
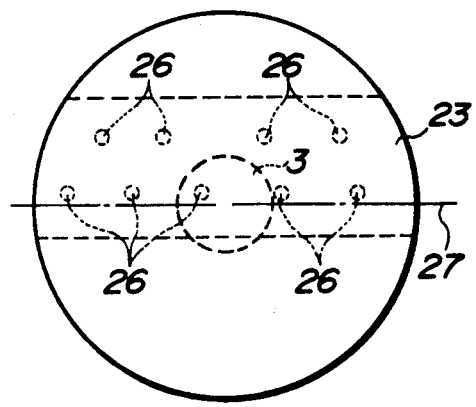
FIG. 13B is a view similar to FIG. 11B, but showing the eighth embodiment.

Referring to FIGS. 13A and 13B, there is shown an eighth embodiment of the present invention, which is similar to the above-mentioned seventh embodiment.

That is, in the eighth embodiment, the partition sheet 23 has a peripheral edge entirely fixed to the inner wall of the air-bag proper 1. The lower edge of the partition sheet 23 is fixed to the most swelled part 1a of the bag proper 1. The partition sheet 23 is formed with a plurality of small openings 22. Due to obstruction by the small openings 26, air blow into the upper chamber is controlled.

Figure 14A:
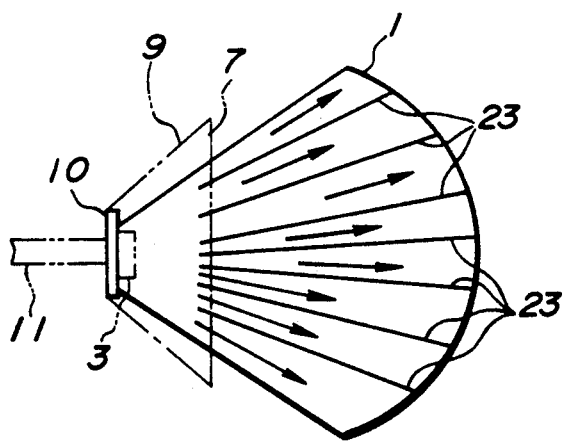
FIG. 14A is a view similar to FIG. 11A, but showing a ninth embodiment of the present invention.
Figure 14B:
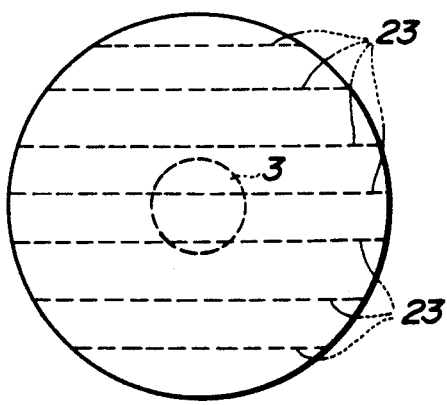
FIG. 14B is a view similar to FIG. 11B, but showing the ninth embodiment.

Referring to FIGS. 14A and 14B, there is shown a ninth embodiment of the present invention.

In this embodiment, a plurality of partition flexible sheets 23 are employed, which installed in the air-bag proper 1 to define a plurality of flat chambers in the air-bag proper 1. Because the gases from the inflator 3 are forced to flow in the independent chambers, there is no possibility of making pressure difference among the chambers of the air-bag proper 1.

Figure 15A:
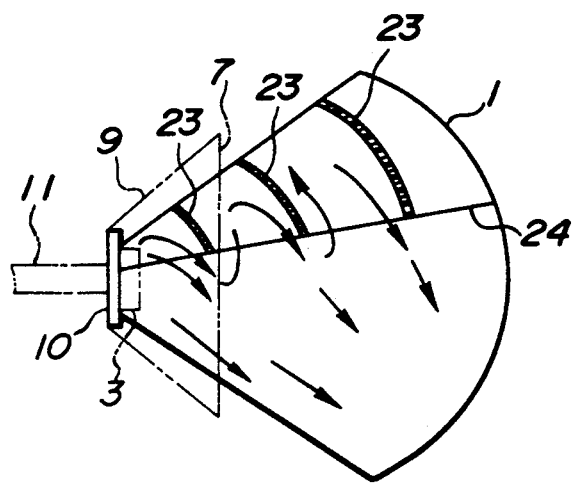
FIG. 15A is a view similar to FIG. 11A, but showing a tenth embodiment of the present invention.
Figure 15B:
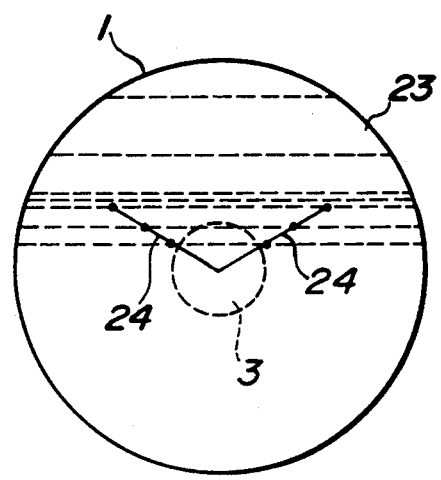
FIG. 15B is a view similar to FIG. 11B, but showing the tenth embodiment.

Referring to FIGS. 15A and 15B, is shown a tenth embodiment of the present invention.

In this embodiment, three partition sheets 23 are employed, which are installed in a portion of the air-bag proper 1 in a manner to have therein four chambers axially arranged. Each partition sheet 23 has upper and side edges fixed to the inner wall of the air-bag proper 1 and a lower edge fixed to two threads 24. As is understood from FIG. 5B, the two threads 24 extend from a common portion of the inflator 3 to spaced portions of the swelled part of the air-bag proper 1.

Due to provision of the partition sheets 23, the upward flow of the gases from the inflator 3 is controlled.

Figure 16A:
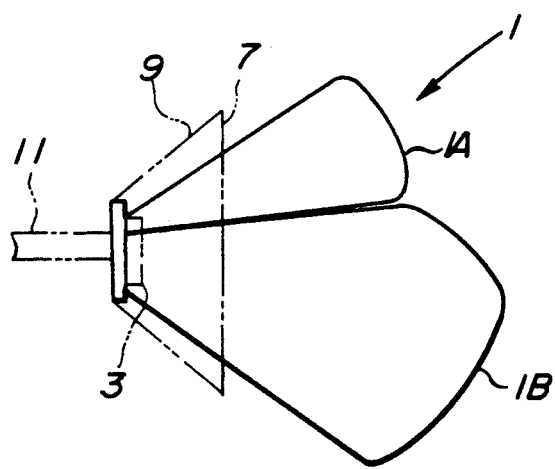
FIG. 16A is a view similar to FIG. 11A, but showing an eleventh embodiment of the present invention.
Figure 16B:
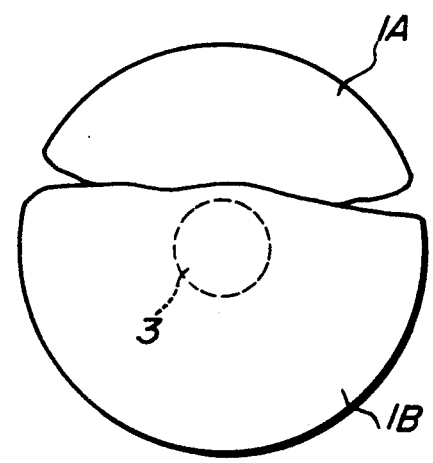
FIG. 16B is a view similar to FIG. 11B, but showing the eleventh embodiment.

Referring to FIGS. 16A and 16B, there is shown an eleventh embodiment of the present invention.

In this embodiment, larger and smaller air-bags 1B and 1A are employed. The larger air-bag 1B is located at a lower portion, while, the smaller air-bag 1A is located at an upper portion with respect to the inflator 3.

Upon inflation, the gases overflowing the upper smaller air-bag 1A are forced to flow into the lower larger air-bag 1B.

Figure 17A:
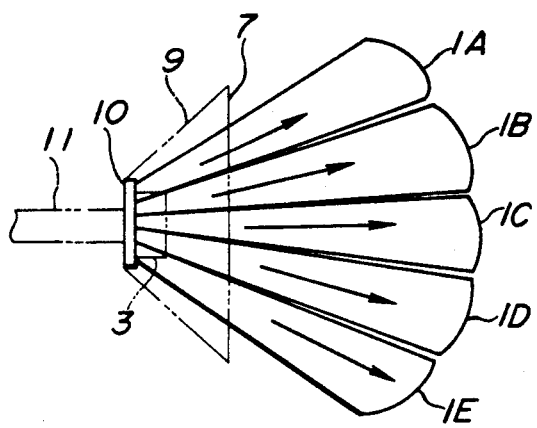
FIG. 17A is a view similar to FIG. 11A, but showing a twelfth embodiment of the present invention.
Figure 17B:
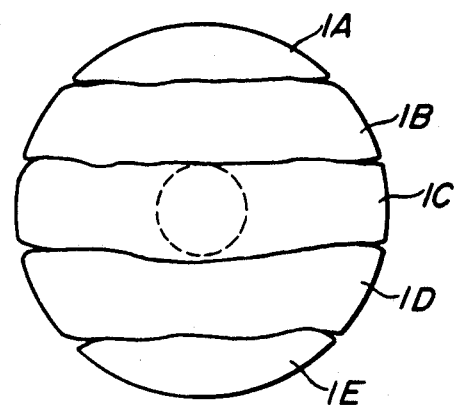
FIG. 17B is a view similar to FIG. 11B, but showing the twelfth embodiment.

Referring to FIGS. 17A and 17B, there is shown a twelfth embodiment of the present invention.

In this embodiment, a plurality of air bags 1A to 1E are employed. Because the gases from the inflator 3 are forced to flow in the independent bags, there is no possibility of making a pressure difference among the bags of the air-bag proper 1.

Figure 18A:
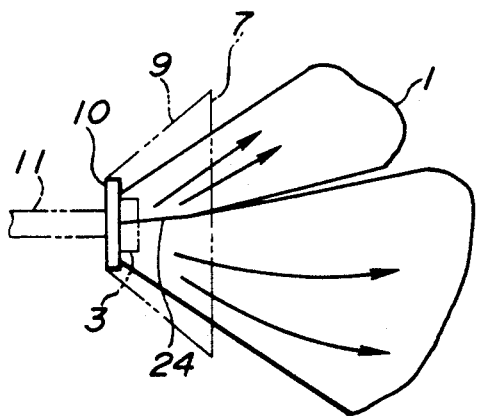
FIG. 18A is a view similar to FIG. 11A, but showing a thirteenth embodiment of the present invention.
Figure 18B:
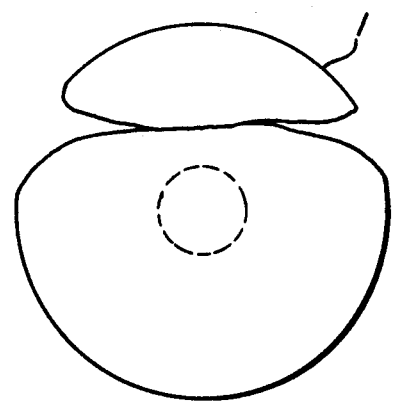
FIG. 18B is a view similar to FIG. 11B, but showing the thirteenth embodiment.
Figure 19:
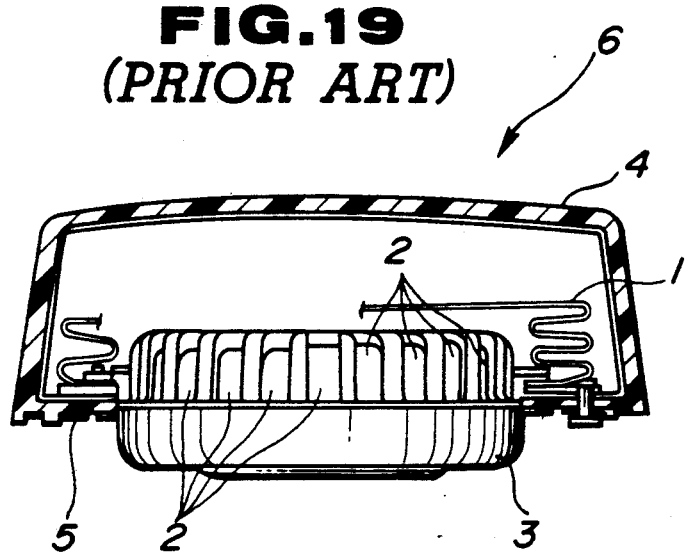
FIG. 19 is a sectional view of a conventional air-bag device.
Figure 20:
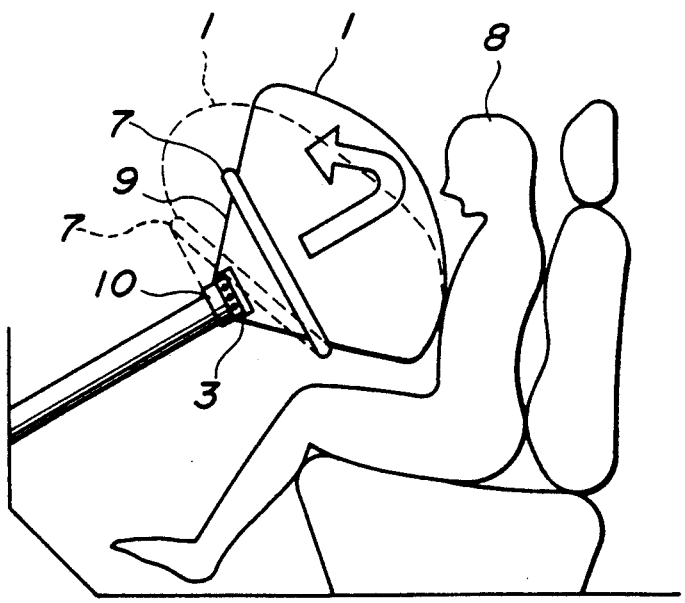
FIG. 20 is a schematic illustration of a driver's position vis-a-vis a deployed air-bag of known type, showing a disadvantageous air-bag displacement phenomenon provided by a conventional air-bag device.

Referring to FIGS. 18A and 18B, there is shown a thirteenth embodiment of the present invention.

In this embodiment, a single air-bag 1 is used, which forms upper smaller and lower larger chambers. That is, a given part of the bag 1 is used and the sewed portion is held by a thread 24 which extends from the inflator 3.

As will be understood from the foregoing description, in the present invention, there is employed a unique structure by which the undesired upward flow of gas in the air-bag proper is controlled or obstructed. Thus, the undesired phenomenon encountered in the afore-mentioned conventional air-bag device is solved by the present invention.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. In a motor vehicle having a steering wheel installed therein, an air-bag device comprising:
   an air-bag mounted to a center pad of said steering wheel, said air-bag having therein upper and lower portions with respect to a condition wherein said air-bag is expanded;

inflator means, for generating gases to be blown into said air-bag;

means for covering said air-bag in a folded up condition;

means for actuating said inflator to generate the gases; and flow-restricting means having a plurality of gas flow openings exposed to the interior of said air-bag, for restricting a flow of the gases from the inflator means through the gas flow openings toward said upper portion of said air-bag, to thereby increase a flow of the gases toward said lower portion of said air-bag.

2. An air-bag device as claimed in claim 1, wherein:
said center pad is kept stationary when said steering wheel is rotated.

3. In a motor vehicle having a steering wheel installed therein, an air-bag device comprising:

an air-bag mounted to a center pad of said steering wheel, said air-bag having therein upper and lower portions with respect to a condition wherein said air-bag is expanded;

inflator means for generating gases to be blown into said air-bag;

means for covering said air-bag in a folded up condition;

means for actuating said inflator to generate the gases; and flow-restricting means having a plurality of gas flow openings exposed to the interior of said air-bag, for restricting a flow of the gases from the inflator means through the gas flow opening toward said upper portion of said air-bag, to thereby increase a flow of the gases toward said lower portion of said air-bag, wherein said center pad is kept stationary when said steering wheel is rotated, and said flow restricting means comprises said gas flow openings which are identical in size and shape, the number of the gas flow openings formed in an upper half of said inflator means being less than that of the gas flow openings formed in a lower half of said inflator means.

4. In a motor vehicle having a steering wheel installed therein, an air-bag device comprising:

an air-bag mounted to a center pad of said steering wheel, said air-bag having therein upper and lower portions with respect to a condition wherein said air-bag is expanded;

inflator means for generating gases to be blown into said air-bag;

means for covering said air-bag in a folded up condition;

means for actuating said inflator to generate the gases; and flow-restricting means having a plurality of gas flow openings exposed to the interior of said air-bag, for restricting a flow of the gases from the inflator means through the gas flow openings toward said upper portion of said air-bag, to thereby increase a flow of the gases toward said lower portion of said air-bag, wherein said center pad is kept stationary when said steering wheel is rotated, and said flow restricting means comprises said gas flow openings, said gas flow openings being provided in first and second groups which are provided at upper and lower halves of said inflator means respectively, the gas flow openings of each group being identical in size and shape, each gas flow opening of said first group being smaller in size than that of said second group.

5. In a motor vehicle having a steering wheel installed therein, an air-bag device comprising:

an air-bag mounted to a center pad of said steering wheel, said air-bag having therein upper and lower portions with respect to a condition wherein said air-bag is expanded;

inflator means, generating gases to be blown into said air-bag, said inflator means having a plurality of gas flow openings exposed to the interior of the air-bag;

means for covering said air-bag in a folded up condition;

means for actuating said inflator means to generate the gases; and flow-restricting means for restricting a flow of the gases from the inflator means through the gas flow openings toward said upper portion of said air-bag, to thereby increase a flow of the gases toward said lower portion of said air-bag, wherein said center pad is kept stationary when said steering wheel is rotated, and said flow restricting means comprises a cover which is fixed to an upper half of said inflator means to spacedly cover the gas flow openings provided at said upper half.

6. An air-bag device as claimed in claim 5, wherein:
said cover is formed with a plurality of openings.

7. An air-bag device as claimed in claim 2, wherein:
said flow restricting means comprises a flexible sheet which has upper and side edges fixed to an inner wall of said upper portion of said air-bag and a lower edge held by a thread which extends between opposed inner walls of said air-bag.

8. An air-bag device as claimed in claim 7, wherein:
an end of said thread is fixed to the most swelled part of the air bag.

9. An air-bag device as claimed in claim 2, wherein:
said flow-restricting means comprises a flexible sheet which has a peripheral edge entirely fixed to an inner wall of the upper portion of said air-bag, said partition sheet being formed with a plurality of openings.

10. An air-bag device as claimed in claim 2, wherein:
said flow-restricting means comprises a plurality of flexible sheets which are installed in said air-bag to define a plurality of chambers in the air-bag.

11. An air-bag device as claimed in claim 2, wherein:
said flow-restricting means comprises a plurality of flexible sheets which are installed in the upper portion of said air-bag to define a plurality of chambers which are arranged in an axial direction with respect to said air-bag.

12. An air-bag device as claimed in claim 11, wherein:
each of said sheets has upper and side edges fixed to the inner wall of said air-bag and a lower edge fixed to two threads which extend from a common portion of said inflator to spaced portions of the most swelled part of said air-bag.

13. An air-bag device as claimed in claim 2, wherein:
said air-bag comprises first and second inner independent air-bags, disposed within said air-bag and connected respectively to upper and lower portions of said inflator, said first inner air-bag being smaller than said second inner air-bag.

14. An air-bag device as claimed in claim 2, wherein:
said flow-restricting means comprises a plurality of small air-bags which are independently connected to said inflator means and coact together as said air-bag.

15. An air-bag device as claimed in claim 2, wherein:
said flow-restricting means comprises a sewed portion of said air-bag by which sewed portion of said air-bag is divided into upper and lower bag portions, said upper bag portion being smaller than said lower bag portion.

16. An air-bag device as claimed in claim 1, wherein:
said center pad is disposed to rotate together with said steering wheel.

17. In a motor vehicle having a steering wheel installed therein, an air-bag device comprising:
an air-bag mounted to a center pad of said steering wheel, said air-bag having therein upper and lower portions with respect to a condition wherein said air-bag is expanded;
inflator means for generating gases to be blow into said air-bag, said inflator means having a plurality of gas flow openings exposed to the interior of the air-bag;
means for covering said air-bag in a folded up condition;
means for actuating said inflator means to generate the gases; and
flow-restricting means for restricting a flow of the gases from the inflator means through the gas flow openings toward said upper portion of said air-bag, to thereby increase a flow of the gases toward lower portion of said air-bag,
wherein said flow-restricting means comprises a cup-shaped cover member which is disposed in said air bag and is rotatably disposed about said inflator means to spacedly cover said gas flow openings and a weight is fixed to a lower portion of said cup-shaped cover member thereby to keep said cup-shaped cover member stationary even when said inflator means rotates together with said steering wheel, wherein said cup-shaped cover member is formed with a plurality of identical openings, the number of the openings provided at an upper half of said cover member being less than that at a lower half of said cover member.

18. An air-bag device as claimed in claim 17, further comprising:
ball bearings for smoothing the rotation of said cup-shaped cover member relative to said inflator means.

19. In a motor vehicle having a steering wheel installed therein, an air-bag device comprising:
an air-bag mounted to a center pad of said steering wheel, said air-bag having therein upper and lower portions with respect to a condition wherein said air-bag is expanded;
inflator means for generating gases to be blown into said air-bag, said inflator means having a plurality of gas flow openings exposed to the interior of the air-bag;
means for covering said air-bag in a folded up condition;
means for actuating said inflator means to generate the gases; and
flow-restricting means for restricting a flow of the gases from the inflator means through the gas flow openings toward said upper portion of said air-bag, to thereby increase a flow of the gases toward lower portion of said air-bag,
wherein said flow-restricting means comprises a plurality of lids which are pivotally connected to said inflator means, each lid being arranged to pivot by its own weight to close a corresponding gas flow opening when the same comes to its upper position and to pivot by its own weight to open the gas flow opening when the same comes to its lower position.

20. In a motor vehicle having a steering wheel which has a center pad rotated therewith, an air-bag device comprising:
an air-bag proper mounted to said center pad;
an inflator mounted to said center pad and having a plurality of gas flow openings exposed to the interior of said air-bag proper, said inflator generating gases which are blown into said air-bag proper through said gas flow openings;
a trimmed cover, covering said air-bag proper in a folded up condition;
an ignitor for actuating said inflator to generate the gases;
a mounting plate secured to said inflator, said mounting plate having an annular groove;
a cup-shaped cover member which is disposed in said air-bag proper and is rotatably disposed about inflator to spacedly cover said gas flow openings, said cup-shaped cover member having an annular bent edge which is slidably received in said annular groove of said mounting plate;
an annular retainer ring securely mounted on said inflator to prevent disconnection of said annular bent edge of the cup-shaped cover member from said annular groove of the mounting plate;
ball bearings operatively interposed between said annular retainer ring and said cup-shaped cover member to assure smooth rotation of said cup-shaped cover member relative to said inflator; and
a weight secured to a lower portion of said cup-shaped cover member thereby to keep said cup-shaped cover member stationary even when said inflator rotates together with said steering wheel;
wherein said cup-shaped cover member is formed with a plurality of identical openings, the number of the openings provided at an upper half of said cover member being less than that at a lower half of said cover member.

21. In a motor vehicle having a steering wheel installed therein, an air-bag device comprising:
a single air-bag proper mounted to a center pad of said steering wheel, said air-bag proper having therein upper and lower portions with respect to a condition wherein said air-bag proper is practically expanded;
an inflator having gas flow openings exposed to the interior of said air-bag proper, said inflator generating, upon being actuated, gases which are to be blown into the air-bag through said gas flow openings;
a trimmed cover covering said air-bag proper in a folded up condition;
an ignitor for actuating said inflator to generate the gases; and
means for restricting a flow of the gases toward said upper portion, to thereby increase a flow of the gases toward the lower portion of said air-bag proper.

* * * * *